June 17, 1924.
R. W. LOWE
DENTAL TOOL
Filed July 23, 1921
1,497,759
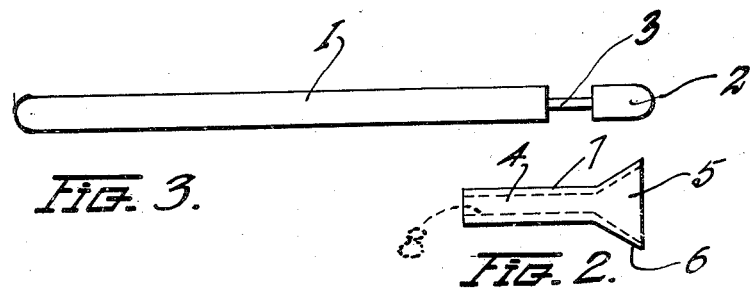
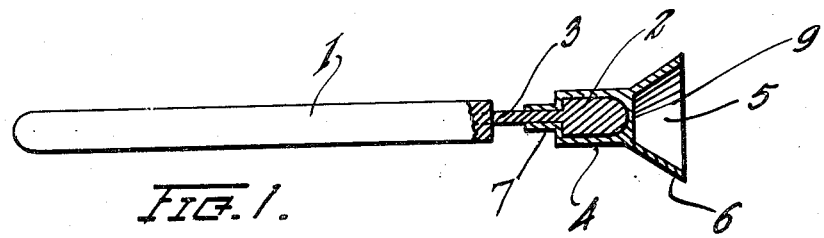
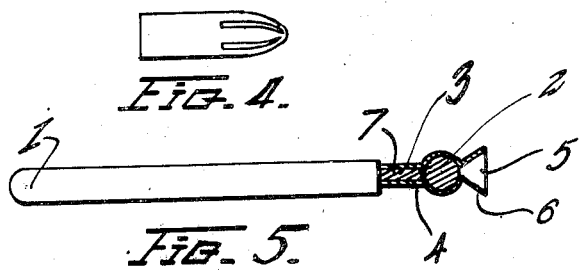
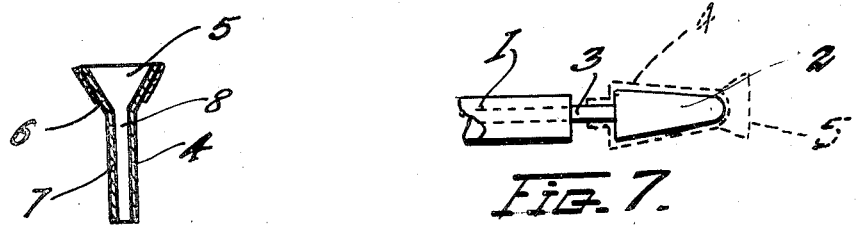
R. W. LOWE INVENTOR.
BY
ATTORNEY.

Patented June 17, 1924.

1,497,759

UNITED STATES PATENT OFFICE.

ROBERT W. LOWE, OF HOLYOKE, MASSACHUSETTS.

DENTAL TOOL.

Application filed July 23, 1921. Serial No. 487,092.

*To all whom it may concern:*

Be it known that ROBERT W. LOWE, a citizen of the United States, residing at Holyoke, in the county of Hampden and State of Massachusetts, has invented certain new and useful Improvements in Dental Tools, of which the following is a specification, reference being had to the accompanying drawing.

This invention refers to dental tools and more particularly those adaptable for the cleansing of teeth or abrading of the same. It has among its objects to provide a method of attaching dental teeth rubbers to spindles that will be secure, sanitary, easy to arrange and effective in every desirable way for this purpose. It also arranges to eliminate the use of screws, pins and the like in the placing of the rubbers or abraiders thereon. And other objects which will become apparent as the invention is more fully set forth.

It has been customary in the past to secure the rubbers, sand paper cones and the other devices for cleaning the teeth, to the operating spindle by means of screws, and pins, which not only take time and care but also have the dangerous possibility of becoming loose and slipping down the throat of the patient or otherwise injuring him. This invention avoids this situation in a very simple and effective way in this art, by providing in place of the screw arrangement, a form of rubber with a rubber flexible shank that will fit over a standard spindle used in dental work, and be secured thereon for the work in question. It has been found out by experiment that this arrangement is entirely satisfactory and affords the advantages of quick attachment, easy removal, and adjustability in use that enables the device to meet many of the peculiar conditions which this class of work entails. Its quick removal affords the facility of keeping it clean or changing it when the matter of changing it may mean exceptional benefits to a waiting patient, and which the present form of tool does not permit. The flexible attachment is such that a certain amount of adjustment can be provided for in the rubber without affecting its security on the spindle, which adjustment enables the flexibility of the rubber cup or the like to be varied to suit various conditions.

In the drawings which illustrate by way of example, a modification of this invention:

Figure 1 is a spindle for dental work, partly in section, having a rubber cup embodying this invention attached to it.

Figure 2 is a detail of a form of the cup; this cup being hollow throughout its length.

Figure 3 is a detail of the spindle.

Figure 4 is a detail of another form of rubber having a corrugated surface.

Figure 5 is a modified form of spindle.

Figure 6 is a modified form of rubber arranged for harder work and provided with corrugated interior to increase the friction of attachment.

Figure 7 is a modified form of the rubber used in this invention.

Similar reference characters refer to similar parts throughout the drawings.

In the construction shown in the drawings, 1 represents a conventional form of dental spindle having a working head 2, which is spinned by the shaft 3 which is operated in the usual manner from a motive device. A rubber 4 having a cup portion 5 with outwardly slanting sides 6 has a shank 7 of rubber or other flexible material provided with a passage 8 arranged to slip over the head 2 and elastically hold thereon. The lower portion of the shank embraces around the head and on to the shaft 3 and locks thereon effectively, so that the rubber cannot be knocked off by the ordinary use of the device. The bottom 9 of the cup may be brought against the head or kept a slight distance therefrom as desired in order to get any desirable resiliency to the device which tooth formation may render necessary.

Modified forms of rubber are provided to meet special conditions. Thus in Figure 2 hollow rubber is provided. In Figure 4 a corrugated rubber. And in Figure 6, a rubber with special surfaces provided in order to get the advantages that this method of holding the devices is provided, for the cases where their use may be of value. In the form of Figure 6, the outlet surface may be hardened or provided with certain abrasive features connected suitably with the rubber.

This method of attaching the rubbers has several other advantages, one of which is that there is a certain amount of slip possible if the rubber is used too hard, thereby avoiding the possibility of pain where the hand of the operator is excessively drastic. For ordinary conditions the slip is negligible except that it gives a torsional action to the rubber which assists in its use.

The manufacture of the device is in its favor as it eliminates several elements and also makes it possible to manufacture the rubbers themselves by the single process of moulding.

While several forms of the invention are shown in the drawings, it is not desired to limit this application for patent to that particular form, nor in any other way, otherwise than limited by the prior art, as many modifications in the construction could be made using the same principles, and coming within the scope of the appended claim.

Having thus described the invention, what is claimed is:

A dental tool of the class described, comprising in combination, an operating spindle, a circular flexible rubber having a hollow bell-like form with the edge rim flared outwardly to provide a rubbing edge, and a flexible rubber shank integrally attached to said rubber having a restricted interior spindle passage resiliently fitted over the end portion of the spindle substantially as described.

In testimony whereof I hereunto affix my signature in the presence of two witnesses.

ROBERT W. LOWE.

Witnesses:
  CONSTANCE SAVAGE,
  A. P. CONNOR.